(12) United States Patent
Hert

(10) Patent No.: US 6,509,090 B1
(45) Date of Patent: Jan. 21, 2003

(54) COMPOSITION COMPRISING METALLOCENE PLASTOMER AND ETHYLENE/ALKYL (METH) ACRYLATE POLYMER WITH THEIR SECANT MODULI RATIO GREATER THAN 1

(75) Inventor: Marius Hert, Serquigny (FR)

(73) Assignee: Elf Atochem S.A., Puteaux (FR)

( * ) Notice: Subject to any disclaimer, the term of this patent is extended or adjusted under 35 U.S.C. 154(b) by 0 days.

(21) Appl. No.: 09/463,921

(22) PCT Filed: Jul. 30, 1998

(86) PCT No.: PCT/FR98/01696

§ 371 (c)(1),
(2), (4) Date: Apr. 10, 2000

(87) PCT Pub. No.: WO99/06483

PCT Pub. Date: Feb. 11, 1999

(30) Foreign Application Priority Data

Aug. 1, 1997 (FR) .............................. 97 09859

(51) Int. Cl.⁷ ........................... B32B 27/32; C08L 23/08
(52) U.S. Cl. .............................. 428/355 RA; 428/515; 428/516; 428/520; 428/522; 428/352; 525/240
(58) Field of Search ................. 428/500, 515, 428/516, 355 RA, 520, 522, 357; 525/240

(56) References Cited

U.S. PATENT DOCUMENTS

| | | | |
|---|---|---|---|
| 3,176,052 A | 3/1965 | Peticolas | 260/897 |
| 4,623,581 A | 11/1986 | Hert | 428/220 |
| 5,051,297 A | 9/1991 | Reich et al. | 428/220 |
| 5,326,602 A | 7/1994 | Rifi | 428/35.7 |
| 5,376,439 A | 12/1994 | Hodgson et al. | 428/220 |
| 5,593,747 A | 1/1997 | Georgelos | 428/36.7 |
| 5,998,017 A * | 12/1999 | Eichbauer | 428/343 |

FOREIGN PATENT DOCUMENTS

| | | |
|---|---|---|
| EP | 0006110 | 5/1985 |
| EP | 0597502 | 5/1994 |
| WO | 9507314 | 3/1995 |

* cited by examiner

Primary Examiner—D. Lawrence Tarazano
(74) Attorney, Agent, or Firm—Baker Botts L.L.P.

(57) ABSTRACT

The invention concerns a composition comprising an ethylene/alpha-olefin metallocene copolymer and an ethylene/alkyl (meth)acrylate radical copolymer, the ratio of their secant moduli being greater than 1. The invention also concerns films obtained from said composition, in particular a stretchable adhesive film, and a high temperature extrusion method.

17 Claims, No Drawings

COMPOSITION COMPRISING METALLOCENE PLASTOMER AND ETHYLENE/ALKYL (METH) ACRYLATE POLYMER WITH THEIR SECANT MODULI RATIO GREATER THAN 1

CROSS-REFERENCE TO RELATED APPLICATIONS

This application is a national phase application of International Application No. PCT/FR98/01696, which was filed on Jul. 30, 1998, and which published in French on Feb. 11, 1999, which in turn claims priority from French Application No. P 97/09859, which was filed on Aug. 1, 1997.

BACKGROUND OF THE INVENTION

The present invention relates to a novel composition of metallocene plastomer and ethylene/alkyl (meth)acrylate copolymer, and to objects obtained therefrom.

Copolymers of ethylene and alpha-olefin obtained by single-site metallocene catalysis are known. As these copolymers are homogeneous in composition, it has been possible to prepare products having a density comprised, for example, between 0.905 and 0.880 g/cm$^3$, known as plastomers, having good mechanical and optical properties. The molecular distribution of such plastomers is very narrow and is characterized by a polydispersity index (ratio I=Mw/Mn) which is low, in general I<3.

Consequently, if such plastomers have good mechanical and optical properties, their rheology makes them poorly suited to implementation by extrusion or injection molding, because of the following characteristics:

high specific energy due to elevated viscosity at the shearing gradients of extrusion screws;

tendency to extrusion faults;

instability of the molten material leaving the die due to poor elongational viscosity.

One consequently looks for means of modifying the rheological behavior of such ethylene metallocene (plastomer) copolymers while still preserving their mechanical and optical properties.

Several documents disclose modification of certain ethylene/alpha-olefin (co)polymers through mixing with other (co)polymers.

U.S. Pat. No. 3,176,052 discloses homogeneous mixtures comprising, by weight, (a) 25 to 95% ethylene/alpha-olefin copolymer obtained by Ziegler-Natta catalysis having a density higher than 0.92 g/cm$^3$ and an MFI comprised between 0.1 and 10 dg/min, which is heterogeneous in composition, and (b) 75 to 5% of a radical polyethylene having a density comprised between 0.91 and 0.94 g/cm$^3$.

U.S. Pat. No. 4,623,581 discloses a homogenous mixture comprising, by weight, (a) 25 to 98% ethylene/alpha-olefin copolymer which is heterogeneous in composition with a density between 0.905 and 0.940 g/cm$^3$ and an MFI comprised between 0.4 and 3 dg/min, and (b) 75 to 2% of a radical polyethylene having a density comprised between 0.91 and 0.94 g/cm$^3$, which has a polydispersity index above 4, said polymer having specific properties of crystallinity and alpha-olefin monomer distribution. The radical polyethylene according to that patent can be an ethylene copolymer with up to 20% by weight of an alkyl acrylate, for example, 17.5% by weight butyl acrylate. There is no mention in this document of the improvement to rheological properties of the modified polymers; further, this is not the intended aim. This patent also indicates that these modified ethylene polymers do not have a polydispersity index comprised between 2.7 and 4.1 (by making reference to European patent application 0,006,110); these modified ethylene polymers consequently have a satisfactory rheology which does not need to be modified.

European patent Application 0,006,110 discloses a mixture comprising, by weight, (a) 80 to 99% of ethylene/alpha-olefin copolymer having a polydispersity index comprised between 2.7 and 4.1 and (b) 20 to 1% of a high pressure low-density homopolyethylene, the addition of low density PE being intended to overcome the defective rheology of the ethylene/alpha-olefin copolymer.

International Application WO-A-9507314 discloses packagings obtained from substantially linear ethylene/alpha-olefin copolymers having low polydispersity indexes, for example comprised between 1.5 and 2.5. This patent discloses the addition of several types of film property modifiers, including rheology modifiers, while also indicating that the ethylene/alpha-olefin copolymers are preferably employed alone. The modifiers indicated in the description include LDPE, EVA, EVOH, PB, HDPE and LLDPE. The example given in that patent mentions LDPE or a linear EP copolymer as rheology modifier. However, such rheology modifiers have very high moduli, and consequently do not allow industrial production of film having adequate properties. Another possible modifier according to that document is an EVA; nevertheless, this modifier cannot be extruded at a sufficiently high temperature as it degrades at temperatures of 220° C. or even lower.

U.S. Pat. No. 5,326,602 discloses compositions comprising an ethylene polymer with an ethylene/acrylate copolymer. The ethylene polymer is obtained by Ziegler-Natta catalysis and does not have a narrow molecular distribution. Additionally, that patent does not disclose the action of ethylene/acrylate copolymer on the processability of an ethylene polymer.

U.S. Pat. No. 5,593,747 discloses compositions comprising a particular metallocene ethylene polymer, intended for the manufacture of heat-shrinkable films. In that patent, this metallocene polymer can be mixed with a thermoplastic polymer. However, the only examples given cover addition of EVA.

European Patent Application 0,597,502 discloses compositions comprising a metallocene ethylene polymer having a density of at least 0.900 g/cm$^3$, also intended for manufacture of heat-shrinkable films. In that patent, this metallocene polymer can be mixed with a thermoplastic polymer of the radical ethylene copolymer type. Although ethylene/acrylate copolymers are specifically mentioned, the only examples cover the addition of EVA.

In fact, adding EVA to a metallocene polymer does not make it possible to improve processability. Additionally, EVA is unstable at high extrusion temperatures, notably of the order of 200 to 220° C.

None of the above documents teaches nor suggests the present invention.

SUMMARY OF THE INVENTION

The invention provides a composition comprising, by weight:
(i) from 1 to 99% of a metallocene catalyzed ethylene/alpha-olefin copolymer; and
(ii) from 99 to 1% of a radically catalyzed ethylene/alkyl (meth)acrylate copolymer, the ratio of their secant moduli being greater than 1.

In one embodiment, the radically catalyzed ethylene/alkyl (meth)acrylate copolymer content is comprised between 5 and 25%.

Preferably, the flexural modulus of each copolymer is comprised between 10 and 100 Mpa.

The ratio of their flexural moduli is advantageously greater than 1.

The metallocene catalyzed ethylene/alpha-olefin copolymer has a polydispersity index of for example between 2 and 5, and preferably between 2 and 3.

The metallocene catalyzed ethylene/alpha-olefin copolymer has a density for example comprised between 0.905 and 0.880 and preferably between 0.900 and 0.880 g/cm$^3$.

The metallocene catalyzed ethylene/alpha-olefin copolymer has an MFI comprised for example between 0.5 and 10 dg/min, and preferably between 0.8 and 5 dg/min.

The radically catalyzed ethylene/alkyl (meth)acrylate copolymer for example comprises, by weight based on the weight of said copolymer, from 5 to 40% of a $C_1$ to $C_8$ alkyl (meth)acrylate.

The radically catalyzed ethylene/alkyl (meth)acrylate copolymer has an MFI typically comprised between 0.3 and 10 dg/min.

The invention also provides a film obtained from a composition according to the invention, preferably extruded.

The invention particularly provides a stretchable cling film obtained from the composition of the invention.

The invention also provides a process for extruding a composition according to the invention, comprising extruding said composition at a temperature greater than or equal to 200° C., for example between 210 and 230° C., in particular for the production of film.

The invention will now be described in more detail below.

DETAIL DESCRIPTION OF THE INVENTION

The term "metallocene catalyzed ethylene/alpha-olefin copolymer" as used herein refers to such copolymers obtained by metallocene catalysis and the expressions "plastomers" or "metallocene catalyzed ethylene copolymer" are equivalent in the description below.

It will be recalled that such metallocene catalysis is a single-site catalysis implementing a catalyst generally constituted by a metal atom between two alkyl cycles bonded to the metal. For the metal, all the metals of transition groups IVA, VA and VIA can be used as well as the lanthanides. Preferred metals are hafnium, zirconium and titanium. For the alkyl cycle, one would generally use cyclopentadiene. Optionally, a co-catalyst or activator such as for example an aluminoxane, such as methylaluminoxane (MAO) will be used. For other details of such catalysis, the person skilled in the art is referred to classical works in the field.

For the alpha-olefin, any alpha-olefin having 3 to 12 carbon atoms, preferably 3 to 8 carbon atoms can be used. Examples of alpha-olefin are propylene, butene, hexene and octene. A preferred alpha-olefin is octene. The alpha-olefin proportion in the plastomer can extend up to 40% by weight and varies conventionally between 10 and 35% by weight, for example between 10 and 30%.

In the case of a stretchable cling film, one for example can use octene as alpha-olefin, the proportion being comprised for example notably between 20 and 25%.

These plastomers of the invention are homogeneous in composition.

The density of these metallocene catalyzed copolymers is less than 0.900 g/cm$^3$, generally comprised between 0.900 and 0.875 g/cm$^3$, preferably between 0.900 and 0.880 g/cm$^3$.

The polydispersity index of these plastomers is low, generally comprised between 2 and 5, preferably between 2 and 3. The MFI (molten flow index as measured by ASTM D 1238-73) is generally comprised between 0.5 and 10 dg/min, preferably between 0.8 and 5 dg/min.

These plastomers are substantially linear.

The flexural modulus of such plastomers is preferably comprised between 10 and 100 Mpa; for example between 10 and 50 Mpa.

Mixtures of plastomers are also envisaged.

Such plastomers are available commercially from Dow and Exxon under the respective names of Affinity and Exact.

The term "radically catalyzed ethylene/alkyl (meth) acrylate copolymer" designates such copolymers comprising, by weight with respect to the weight of said polymer, up to 60% by weight of alkyl (meth)acrylate obtained by synthesis with free radical initiator, the terms used herein "ethylene/(meth)acrylate copolymer" and "EAA copolymer" being equivalent.

These EAA copolymers are generally obtained in a high pressure process and generally exhibit a wide molecular distribution and long branching distribution (i.e. a branch having a number of monomer segments of the same order as that of the main chain). Examples and methods of preparing such EAA copolymers are for example given in U.S. Pat. Nos. 4,617,366 and 5,543,233, incorporated herein by reference.

The (meth)acrylate weight content with respect to the EAA copolymer weight is generally comprised between 1 and 60%, in particular between 5 and 40%.

The expression alkyl (meth)acrylate refers to linear, branched or cyclic alkyl methacrylate and acrylate having from 1 to 12, preferably 1 to 8 carbon atoms, for example methyl, ethyl, butyl and 2-ethylhexyl. Specific examples of EAA copolymer are methyl methacrylate, methyl acrylate, ethyl acrylate, butyl acrylate.

The MFI index of such EAA copolymers is generally comprised between 0.1 and 400 dg/min, for example between 0.3 and 10 dg/min.

Other monomers can optionally be present in the EAA copolymers, provided the final properties are not affected. Examples of such termonomers are saturated carboxylic acid, vinylic esters, maleic anhydride and glycidyl (meth) acrylate. This termonomer can be present in an amount of, for example, up to 10% by weight, based on the weight of said EAA copolymer, and can be grafted or terpolymerized.

As the thermal degradation temperature of these EAA copolymers is high, habitual plastomer transformation temperatures can be employed without any risk of degrading the EAA copolymers.

The flexural modulus of such EAA copolymers is preferably comprised between 10 and 100 Mpa; for example between 10 and 50 Mpa.

Mixtures of EAA copolymers are also envisaged.

In the case of stretchable cling films, a preferred EAA comprises a methylacrylate and/or has an MFI comprised between 3 and 10 dg/min and/or comprises between 20 and 35% by weight acrylate.

Such EAA copolymers are available commercially from Elf Atochem under the brand name Lotryl®.

One particular embodiment corresponds to the case where the ratio:

$$\frac{\text{flexural modulus of plastomer}}{\text{flexural modulus of EAA copolymer}}$$

is greater than 1 and for example comprised between 1 and 3.

Such a ratio is for example useful for "bulky" objects obtained from compositions of the invention.

Another particular embodiment corresponds to the case where the ratio:

$$\frac{\text{Secant modulus of the plastomer}}{\text{Secant modulus of EAA copolymer}}$$

is greater than 1 and for example, is comprised between 1 and 3.

Such a ratio is useful for example for films obtained from compositions of the invention.

It will be clear that other polymers can also be added to the compositions according to the invention, in amounts that do not impair the sought-after properties and which are conventional for the person skilled in the art.

It is equally clear that conventional additives and supplements can be added to the mixtures according to the invention in conventional amounts for the person skilled in the art. Examples of such additives are anti-UV, anti-oxidizing agents, pigments, fillers such as silica, fibers, etc.

The invention also provides objects obtained from such mixtures, and notably films. The thickness of the film is conventional comprised for example between 10 and 500 μm. The films are manufactured in conventional plant for PE, LDPE, etc.

The films according to the invention comprise at least one layer obtained from a composition according to the invention.

According to one alternative embodiment, the films according to the invention comprise a cling layer and are stretchable cling films. In this case, the cling layer according to the invention comprises sufficient EAA copolymer, advantageously from 5 to 50%, EAA polymer in which the acrylate comonomer content is advantageously comprised between 10 and 35%, preferably between 20 and 35%.

According to another alternative embodiment, the films according to the invention comprise a cling layer obtained from the composition according to the invention, and a slip layer. This slip layer can be obtained from a polyolefin such as a polypropylene or polyethylene (LLDPE, LDPE, metallocene). This slip layer can also contain anti-bonding and/or sliding additives. In the film, the cling layer represents from 5 to 95%, preferably 5 to 35%, advantageously 10 to 20% of the combined thickness of the cling and slip layers.

Other layers may be present for obtaining multi-layer films.

The mixtures according to the invention can be prepared by any conventional process, notably compounding, using, for example, a single-screw kneading profile extruder, twin-screw extruders, internal mixers, cylinder mixers, etc. The mixtures can also be obtained directly with transformation extruders, extruded in the form of tubes, films, shaped parts, on injection press, etc. The operating conditions are the ones conventional for PE, LDPE, etc.

In particular, it is possible to extrude the compositions of the invention at temperatures greater than or equal to 200° C., for example between 210 and 230° C., without any danger of deteriorating the products.

The invention consequently makes it possible (i) to modify metallocene catalyzed plastomers to impart processability suitableness to them, notably for reducing specific energy and improving extrudate stability and, in parallel (ii) modification of the EAA copolymers to improve their mechanical and optical properties.

The following examples illustrate the invention without limiting it.

EXAMPLES

In these examples, the mixtures were obtained on a tube extruder fitted with a three-zone screw with a mixture of the type for radical LDPE, and of 45 mm diameter. Temperature profile is increasing, and terminates at 230° C., screw speed being 100 rpm for extrusion of the controls and the compositions according to the invention. All the sleeves are stretched to a thickness of 500 μm with a blowing ratio of 2.

The compositions were obtained from the following copolymers:

A1 ethylene/octene copolymer of bulk composition 88/12, obtained by metallocene catalysis, of density 0.902 g/cm$^3$, MFI 1.0 dg/min, corresponding to the copolymer in the second line of table 1, page 6, of international application WO-A-9507314.

A2 ethylene/octene copolymer of bulk composition 86/14, obtained by metallocene catalysis, of density 0.895 g/cm$^3$, of MFI 1.6 dg/min.

B ethylene/methyl acrylate copolymer of MFI 2 dg/min and bulk ratio amount of methyl acrylate of 16.5% (corresponding to a molar percentage of 6%).

C ethylene/methyl acrylate copolymer of MFI 0.3 dg/min and bulk methyl acrylate percentage of 14% (corresponding to molar percentage of 5%).

D ethylene/methyl acrylate copolymer of MFI 7 dg/min and bulk methyl acrylate percentage of 28%.

The following characteristics were determined on the examples below:

Specific energy of the material in kWh/kg corresponding to motor power of the extruder with respect to material throughput.

Haze expressed as percentage of light scattered, measured as per ASTM D 1003.

Tear resistance measured by the Elmendorf (ASTM D 1922) method in the machine direction (MD) and transverse direction (TD) expressed in g/50 μm.

Impact resistance measured by the Dart (ASTM D 1709) method expressed in g/50 μm.

Secant modulus (or modulus at 1% elongation) measured according to ASTM-D-882, expressed in Mpa.

Comparative Example A (ECA)

Copolymer A1 was extruded alone. Extrusion throughput was less than 34 kg/h and an absence of stability of the extrudate and a specific energy of the polymer leading to the motor absorbing a power very close to the acceptable limit were noted.

This example was repeated with copolymer A2; the same results were obtained.

Comparative Example B (ECB)

Copolymer B was extruded alone. Extrusion was stable at a throughput of 34 kg/h and it was noted that the motor was absorbing a power corresponding to around 50% of the maximum.

Comparative Example C (ECC)

Copolymer C was extruded alone. Extrusion was stable at a throughput of 35 kg/h and it was noted that the motor was absorbing a power corresponding to around 65% of the maximum.

Example 1

A mixture of 80% by weight copolymer A1 and 20% by weight of copolymer B was prepared. A stable extrudate was obtained with an increase in throughput of 10%. The film had good optical properties and improved tear resistance compared to films from A1 and B alone.

Example 2

80% by weight copolymer A1 were mixed with 20% by weight copolymer C. A stable extrudate was obtained with an increase in throughput of 10%.

Example 3

60% by weight copolymer A1 were mixed with 40% by weight copolymer B. A stable extrudate was obtained with an increase in throughput of 20%.

Example 4

60% by weight copolymer A1 were mixed with 40% by weight copolymer C. A stable extrudate was obtained with an increase in throughput of 20%.

Examples 1 to 4 were repeated with copolymer A2; similar results were obtained.

Example 5

40% by weight copolymer A1 were mixed with 60% by weight copolymer B. Extrusion remained stable. An improvement in impact resistance, tear resistance and haze were noted.

Example 6

40% by weight A1 were mixed with 60% by weight copolymer C. Extrusion remained stable. An improvement in impact resistance, tear resistance and haze were noted.

Example 7

20% by weight copolymer A1 were mixed with 80% by weight copolymer B. Extrusion remained stable. An improvement in impact resistance was noted.

Example 8

20% by weight copolymer A1 were mixed with 80% by weight copolymer B. Extrusion remained stable. An improvement in impact resistance, tear resistance and haze were noted.

The results are summarized in the table below in which (2) means that the example is the one corresponding to copolymer A2. A reading of the results makes it possible to conclude that the mixtures according to the invention offer good mechanical and optical properties while allowing improved processability.

Example 9

60% by weight copolymer A1 were mixed with 40% by weight copolymer D. The properties of the resulting film were determined. This film is a stretchable cling film.

Example 10

A twin-layer product was prepared, the cling layer of which was the layer of the preceding example and the slip layer of which was obtained from copolymer A1, the cling layer making up 18% of the overall thickness of the final film.

Examples 9 and 10 were repeated with copolymer A2; the same results were obtained.

Example 11

Example 9 was repeated this time with a copolymer of density 0.891, comprising 24% by weight octene. A film having excellent cling properties was obtained.

Obviously, the present invention is not limited to the embodiments indicated, but may be subject to numerous variations readily accessible to those skilled in the art.

| Ex. | Composition (%) | | | | Specific energy (kWh/g) | Haze (%) | Impact resistance (g) | Tear resistance (g) | | Secant module |
| --- | --- | --- | --- | --- | --- | --- | --- | --- | --- | --- |
| | A1 | A2 | B | C | | | | MD | TD | |
| ECA | 100 | | | | 0.35 | 1.6 | >840 | 688 | 779 | 26 |
| ECA (2) | | 100 | | | 0.35 | 1.9 | >840 | 580 | 1044 | 28.2 |
| ECB | | | 100 | | 0.16 | 8.7 | 373 | 253 | 302 | 18.4 |
| ECC | | | | 100 | 0.23 | 25.3 | 571 | 165 | 360 | 16.8 |
| 1 | 80 | | 20 | | 0.32 | 3.1 | >840 | 790 | 958 | 22.3 |
| 1 (2) | | 80 | 20 | | 0.32 | 3.3 | >840 | 691 | 1078 | 24.3 |
| 2 | 80 | | | 20 | 0.33 | 6.8 | >840 | 661 | 749 | 18.5 |
| 2 (2) | | 80 | | 20 | 0.33 | 7.0 | >840 | 606 | 886 | 19.5 |
| 3 | 60 | | 40 | | 0.22 | 4.6 | >840 | 522 | 674 | 22.8 |
| 3 (2) | | 60 | 40 | | 0.22 | 4.9 | >840 | 488 | 722 | 23.9 |
| 4 | 60 | | | 40 | 0.31 | 10.5 | >840 | 563 | 728 | 22.4 |
| 4 (2) | | 60 | | 40 | 0.31 | 11.8 | >840 | 531 | 828 | 24.1 |
| 5 | 40 | | 60 | | 0.20 | 9 | >840 | 330 | 467 | 18.8 |
| 6 | 40 | | | 60 | 0.27 | 12.3 | >840 | 350 | 517 | 19.4 |
| 7 | 20 | | 80 | | 0.18 | 13.1 | >840 | 219 | 282 | 29.4 |
| 8 | 20 | | | 80 | 0.23 | 17.8 | 727 | 190 | 379 | 28 |

What is claimed is:

1. A stretchable cling film, comprising at least one cling layer obtained from a composition comprising, by weight:

(i) from 50 to 95% of a metallocene catalyzed ethylene/alpha-olefin copolymer; and (ii) from 50 to 5% of a radically catalyzed ethylene/alkyl (meth)acrylate copolymer, the ratio of their secant moduli being greater than 1.

2. The film according to claim 1, in which the metallocene catalyzed ethylene/alpha-olefin copolymer has a polydispersity index between 2 and 5.

3. The film according to claim 1, in which the metallocene catalyzed ethylene/alpha-olefin copolymer has a density of between 0.900 and 0.880 g/cm$^3$.

4. The film according to claim 1, in which the metallocene catalyzed ethylene/alpha-olefin copolymer comprises an alpha-olefin proportion between 10 and 30% by weight.

5. The film according to claim 1, in which the metallocene catalyzed ethylene/alpha-olefin copolymer is an ethylene/octene copolymer.

6. The film according to claim 1, in which the radically catalyzed ethylene/alkyl (meth)acrylate copolymer comprises by weight based on the copolymer weight, from 5 to 40% of a $C_1$ to $C_8$ alkyl (meth)acrylate.

7. The film according to claim 1, in which the radically catalyzed ethylene/alkyl (meth)acrylate copolymer has an MFI of between 0.3 and 10 dg/min.

8. The film according to claim 1, additionally comprising a slip layer.

9. The film according to claim 8, in which said slip layer comprises a polyolefin.

10. The film according to claim 8, in which the cling layer represents from 5 to 35% of the combined thickness of the cling and slip layers.

11. A process for preparing a film according to claim 1, comprising extruding said composition at a temperature greater than or equal to 200° C.

12. A stretchable cling film comprising at least one cling layer obtained from a composition comprising, by weight:

(i) from 50 to 95% of a metallocene catalyzed ethylene/alpha-olefin copolymer; and (ii) from 50 to 5% of a radically catalyzed ethylene/alkyl (meth)acrylate copolymer, the ratio of their secant moduli being greater than 1, and wherein the metallocene catalyzed ethylene/alpha-olefin copolymer is an ethylene/octene copolymer comprising an octene proportion between 10 and 30% by weight; and the radically catalyzed ethylene/alkyl (meth)acrylate copolymer comprises by weight based on the copolymer weight, from 5 to 40% of a $C_1$ to $C_8$ alkyl (meth)acrylate.

13. The film according to claim 12, in which the metallocene catalyzed ethylene/alpha-olefin copolymer has a density of between 0.900 and 0.880 g/cm$^3$.

14. The film according to claim 12, additionally comprising a slip layer.

15. The film according to claim 14, in which said slip layer comprises a polyolefin.

16. The film according to claim 14, in which the cling layer represents from 5 to 35% of the combined thickness of the cling and slip layers.

17. A process for preparing a film according to claim 12, comprising extruding said composition at a temperature greater than or equal to 200° C.

* * * * *

UNITED STATES PATENT AND TRADEMARK OFFICE
CERTIFICATE OF CORRECTION

PATENT NO. : 6,509,090 B1
DATED : January 21, 2003
INVENTOR(S) : Hert, Marius

It is certified that error appears in the above-identified patent and that said Letters Patent is hereby corrected as shown below:

Column 3,
Line 2, "Mpa." should read -- MPa. --
Line 31, "DETAIL" should read -- DETAILED --

Column 4,
Lines 6 and 55, "Mpa;" should read -- MPa; --
Lines 7 and 56, "Mpa." should read -- MPa. --

Column 6,
Line 56, "Mpa." should read -- MPa. --

Signed and Sealed this

Tenth Day of June, 2003

JAMES E. ROGAN
*Director of the United States Patent and Trademark Office*